(12) United States Patent
van Rensburg et al.

(10) Patent No.: US 9,888,125 B2
(45) Date of Patent: *Feb. 6, 2018

(54) SYSTEMS AND METHODS FOR MANAGING AN EVENT SCHEDULING REQUEST IN A TELEPHONY SYSTEM

(71) Applicant: RingCentral, Inc., Belmont, CA (US)

(72) Inventors: Christopher van Rensburg, Foster City, CA (US); Aleksei Petrov, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/955,234

(22) Filed: Dec. 1, 2015

(65) Prior Publication Data
US 2016/0165055 A1 Jun. 9, 2016

Related U.S. Application Data

(63) Continuation of application No. 14/565,389, filed on Dec. 9, 2014, now Pat. No. 9,241,073.

(51) Int. Cl.
G06F 15/16 (2006.01)
H04M 3/56 (2006.01)
H04M 3/38 (2006.01)
G06Q 10/10 (2012.01)

(52) U.S. Cl.
CPC ........ *H04M 3/565* (2013.01); *G06Q 10/1093* (2013.01); *H04M 3/382* (2013.01); *H04M 3/563* (2013.01); *H04M 2203/2038* (2013.01); *H04M 2203/2072* (2013.01); *H04M 2203/6045* (2013.01); *H04M 2203/6054* (2013.01)

(58) Field of Classification Search
None
See application file for complete search history.

(56) References Cited

U.S. PATENT DOCUMENTS

| | | | |
|---|---|---|---|
| 2003/0112944 A1* | 6/2003 | Brown | H04M 3/42 379/201.01 |
| 2006/0053010 A1 | 3/2006 | Chapman et al. | |
| 2008/0101573 A1* | 5/2008 | Sylvain | H04M 3/42102 379/201.01 |
| 2009/0094088 A1* | 4/2009 | Chen | G06Q 10/06312 705/7.19 |
| 2010/0022225 A1 | 1/2010 | Benger et al. | |
| 2010/0045796 A1* | 2/2010 | Fraley | H04N 5/23203 348/143 |
| 2010/0246785 A1 | 9/2010 | Wang et al. | |
| 2010/0246791 A1 | 9/2010 | Wang et al. | |
| 2010/0306185 A1 | 12/2010 | Smith et al. | |

(Continued)

*Primary Examiner* — Edan Orgad
*Assistant Examiner* — Sithu Ko
(74) *Attorney, Agent, or Firm* — Finnegan, Henderson, Farabow, Garrett & Dunner LLP

(57) ABSTRACT

Systems and methods are disclosed for managing an event scheduling request in a telephony system. According to certain embodiments, a call between a first communication device and a second communication device is established. Upon authenticating a user identity associated with the second communication device, an event scheduling request is determined based on one or more attributes provided to the first communication device. A notification is provided to the second communication device based on the event scheduling request.

20 Claims, 8 Drawing Sheets

(56) References Cited

U.S. PATENT DOCUMENTS

2010/0318398 A1    12/2010   Brun et al.
2012/0150581 A1     6/2012   McPhail
2013/0148798 A1     6/2013   Ellsworth et al.

* cited by examiner

SYSTEMS AND METHODS FOR MANAGING AN EVENT SCHEDULING REQUEST IN A TELEPHONY SYSTEM

CROSS REFERENCE TO RELATED APPLICATION(S)

This is a continuation of application Ser. No. 14/565,389, filed Dec. 9, 2014, which is incorporated herein by reference.

BACKGROUND

The present disclosure relates to communications networks, and particularly, to managing event scheduling using a communication device in a telephony system.

A telephony system allows communication between communication devices. A telephony system is a system of telecommunications in which telephonic equipment is employed in the transmission of speech or other sound between points, with or without the use of wires. A conventional telephony system uses public-switched telephone network (PSTN) technologies. Nowadays, voice over IP (VoIP) technologies are widely used in telephony systems. Using VoIP technologies, a telephony system can deliver voice communications and multimedia sessions over Internet Protocol (IP) networks, such as the Internet.

DETAILED DESCRIPTION

Figure 1:
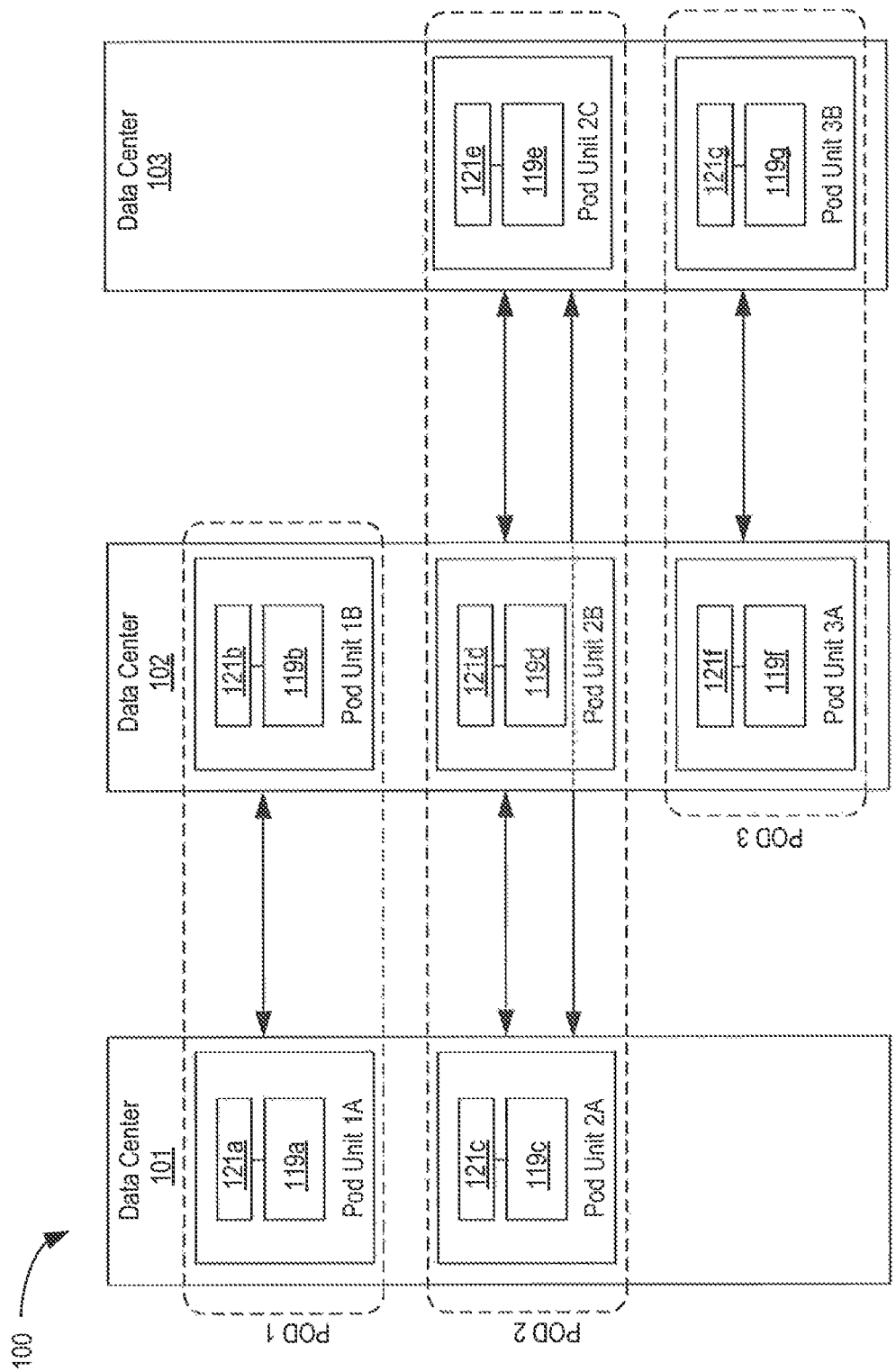
FIGS. 1 and 2 are simplified diagrams of an example of a telephony system in which various implementations described herein may be practiced.

Current telephony systems are unable to utilize contextual information associated with communications to manage event scheduling requests. For example, while current telephony systems allow two users to call each other to schedule a future conference call, current telephony systems cannot recognize and use content from the call to effectively schedule the future conference call while the users are still engaged in the call. One or both the users typically needs to take a note of the scheduling details and manually schedule the conference after the call using a scheduling application, such as the calendar function in Microsoft Outlook®.

Reference will now be made in detail to methods and specific implementations that seek to overcome the foregoing shortcomings of current telephony systems. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Methods, systems, and computer program products are provided herein for managing event scheduling requests in telephony systems and thereby improve the operation of telephony systems as well as components of such systems. According to various implementations, a telephony system includes at least one processor that can establish a call between a first communication device and a second communication device. The call can be a voice, video, or VoIP call. Upon authenticating a user identity associated with the second communication device, the at least one processor can determine an event scheduling request based on one or more attributes of the call such as content from the call and/or contextual information, and provide a notification to the second communication device based on the event scheduling request. The event scheduling request is a request for scheduling a future event. The notification can indicate whether the user of the first communication device is available for the future event. The at least one process can be included in the first communication device, a server, or any other suitable device or component in the telephony system. In various embodiments described herein, managing of event scheduling request can be accomplished automatically with little or no user intervention. Content of the call and/or contextual information can be effectively used to significantly reduce the user efforts required for scheduling a future event.

The example embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples storage media include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 depicts an example of a telephony system 100 in which managing of event scheduling requests as described herein may be implemented. System 100 can be, for example, a telephony system such as a hosted Private Branch Exchange (PBX) platform that provides voice and video over IP, fax services, etc. In some examples, one or more components of telephony system 100, such as data centers 101, 102, and 103, can be used to implement computer programs, applications, methods, processes, or other software to perform the described techniques and to realize the structures described herein. Telephony system 100 includes data centers 101, 102, and 103. Each data center is a point of presence (POP) that includes the network computing resources (e.g., servers, routers, switches, network connections, storage devices, etc.) necessary to support the services provided by telephony system 100. Each data center is typically located in a different geographical region.

In the example embodiment depicted in FIG. 1, telephony system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 2:
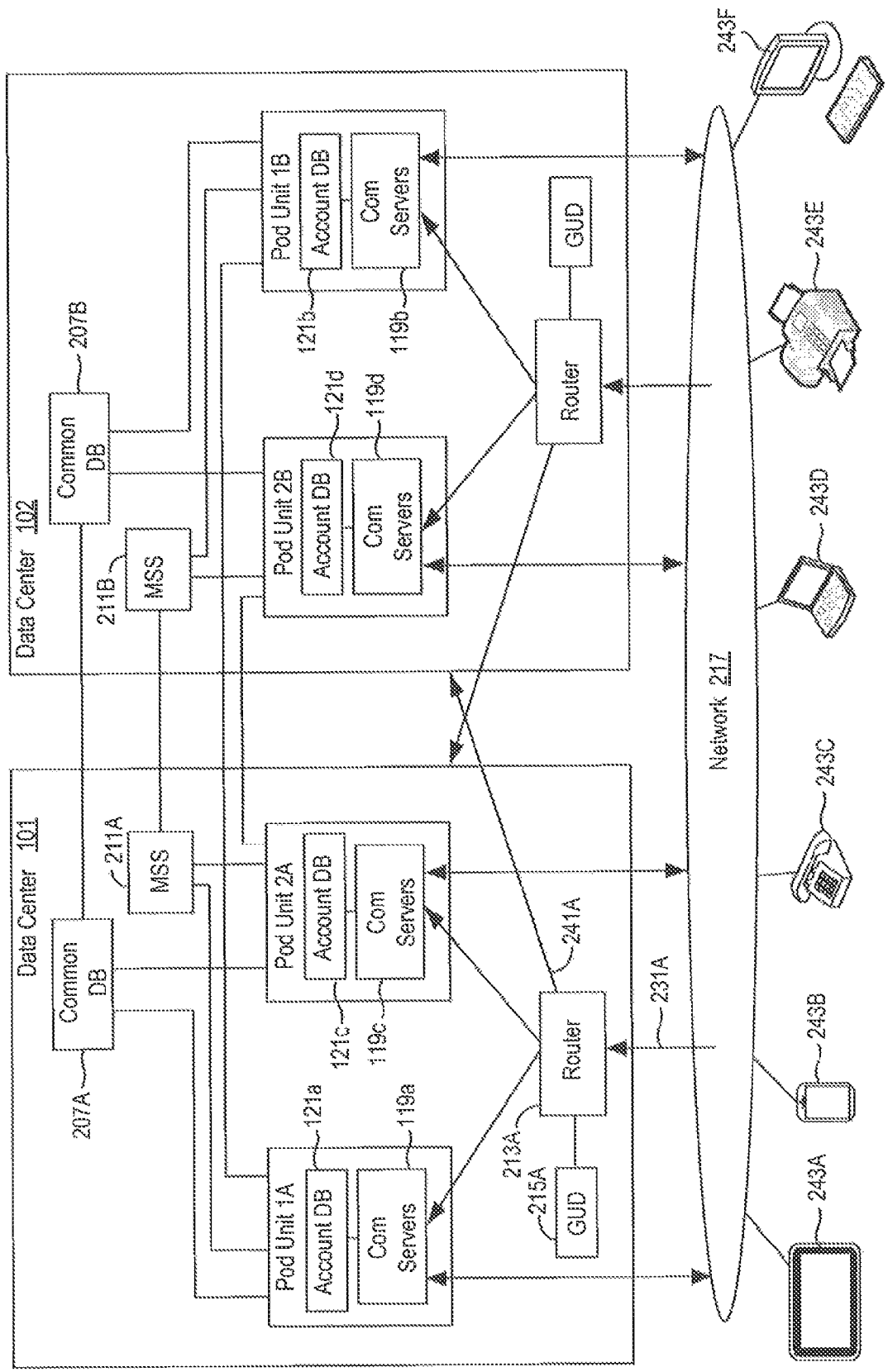

FIG. 2 shows various components of telephony system 100 of FIG. 1. In some examples, one or more components of telephony system 100, such as data centers 101 and 102, and/or communication devices 243A-243F can be used to implement computer programs, applications, methods, processes, or other software to perform the described techniques and to realize the structures described herein. Specifically, FIG, 2 shows the various interconnections within and between data centers 101 and 102. Both data centers are in communication with example network 217. Service requests from various communication devices 243A-243F are routed through network 217 to either or both of the data centers. Devices 243A-243F represent a diversity of client devices that connect with a services system designed in accordance with one or more implementations as described herein. Such client devices include, for example (and without limitation), cell phones, smart phones, tablets, laptop and desktop computers, conventional telephones, VoIP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a muter 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and CUD 215A form a common layer of resources that are shared by all pod units in data center 101.

Figure 3:
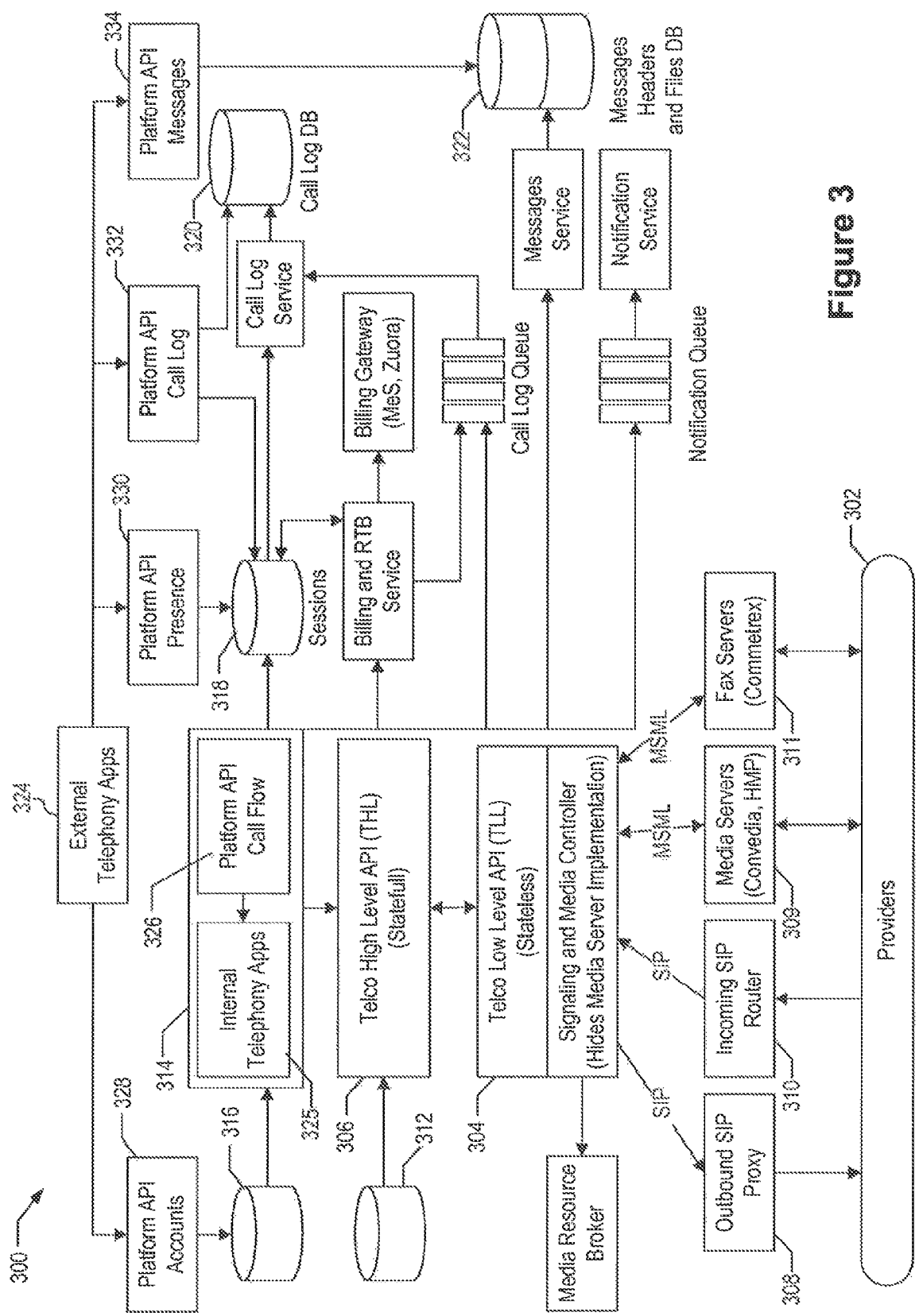
FIG. 3 is a simplified block diagram of an example of a telephony services platform illustrating a telephony system employing techniques as described herein.

FIG. 3 is a simplified block diagram of an example of a PBX platform (e.g., telephony system 100 of FIGS. 1 and 2) employing event scheduling request management techniques as described herein. In some examples, one or more components of the PBX platform, such as Telco APIs 304 and 306, can be used to implement computer programs, applications, methods, processes, or other software to perform the described techniques and to realize the structures described herein. PBX platform 300 provides telephony services that allow communication among its users, and between its users and users associated with a variety of external telephony platforms 302 via telecommunication application programming interfaces (APIs) 304 and 306, Outbound SIP Proxy 308, and Incoming SIP Router 310.

Media Servers 309 and Fax Servers 311 provide functionality for processing VoIP and fax over IP data, respectively. Telco API 304 is a stateless low-level API that provides signaling and media telephony primitives including, for example, call answering, placing of outbound calls, creation of conference call objects, addition of calls to conference call objects, playback of media for active calls, recording of active calls, etc. Telco API 306 is a higher-level API that has more sophisticated functionality such as, for example, interactive voice response (IVR), call forwarding, voice mail, etc. In the depicted implementation, telco API 306 doesn't have access to the PBX platforms databases, but maintains session context data 312 to support its functionality. Telco API 306 may include function primitives which can be used to support the development of telephony applications.

Outbound SIP Proxy 308, and Incoming SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIGS. 1 and 2.

The core functionality of PBX platform 300 (e.g., as described above with reference to FIGS. 1 and 2) is accessed via telephony services block 314 which has access (not entirely shown for clarity) to the various data repositories of PBX platform 300, e.g., account DB 316, sessions DB 318, call log DB, 320 and message DB 322. Telephony services block 314 receives commands from external telephony applications 324 and controls execution of the commands on the PBX platform 300. Telephony services block 314 may also include internal telephony applications 325 that are hosted and/or developed on or in connection with PBX platform 300. The depicted implementation also includes various APIs that allow external telephony applications 324 to interact with PBX platform 300. The APIs associated with PBX platform 300 allow telephony applications 324 and 325 to integrate with basic functionality of PBX platform 300 at multiple integration points, to control call flows during execution of the call flows by the platform (e.g., via API 326), and to access platform data (e.g., in DBs 316-322 via APIs 328-334).

Figure 4:
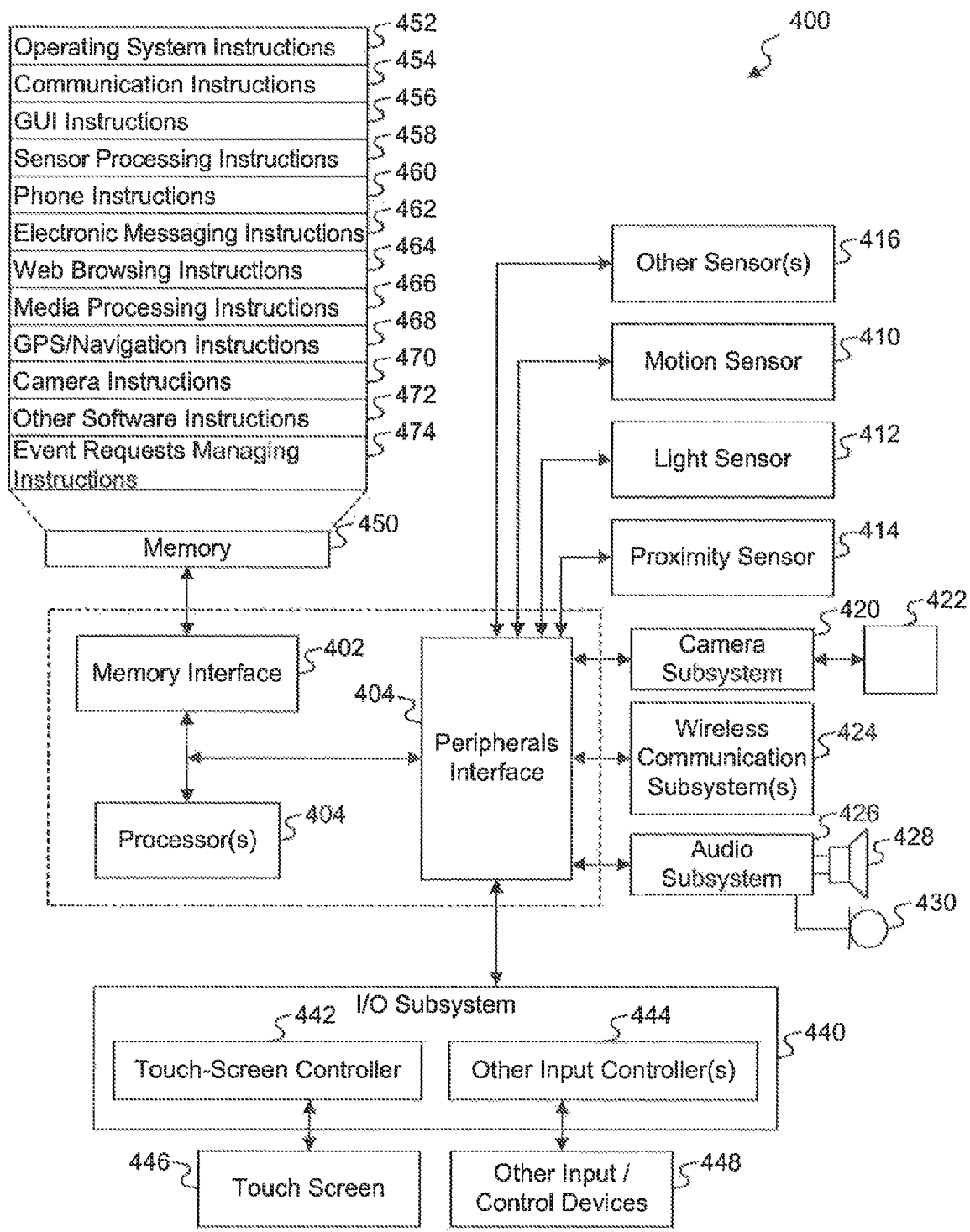
FIG. 4 is a diagram of an example mobile system used in a telephony system for implementing embodiments consistent with the present disclosure.

FIG. 4 is a block diagram of an example architecture 400 of a communication device used in a telephony system, which can function as any of the communication devices depicted in FIG. 1 (e.g., communication devices 243A-243F). The communication device can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the communication device can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a positioning system (e.g., GPS receiver), a temperature sensor, a biometric sensor, or other sensing device, to facilitate related functionalities. A GPS receiver can be integrated with, or connected to, a communication device.

A camera subsystem 420 and an optical sensor 422, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the communication device is intended to operate. For example, a communication device can include communication subsystems 424 designed to operate over a GSM network, a GPRS network, an EDGE network, a Wi-Fi or WiMax network, and a Bluetooth® network. In particular, the wireless communication subsystems 424 can include hosting protocols such that the communication device can he configured as a base station for other wireless devices.

An audio subsystem 426 can be coupled to a speaker 428 and a microphone 430 to facilitate voice-enabled functions, such as voice recognition, voice replication, digital recording, and telephony functions.

The I/O subsystem 440 can include a touch screen controller 442 and/or other input controller(s) 444. The touch-screen controller 442 can be coupled to a touch screen 446. The touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In some implementations, a pressing of the button for a first duration can disengage a lock of the touch screen 446; and a pressing of the button for a second duration that is longer than the first duration can turn power to the communication device on or off. The user can be able to customize a functionality of one or more of the buttons. The touch screen 446 can, for example, also be used to implement virtual or soft buttons and/or a keyboard.

In some implementations, the communication device can present recorded audio and/or video files, such as MP3, AAC, and MPEG files. In some implementations, the communication device can include the functionality of an MP3 player.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks. The operating system 452 can include instructions for handling basic system services and for performing hardware dependent tasks. In some implementations, the operating system 452 can be a kernel (e.g., UNIX kernel), The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes and instructions; camera instructions 470 to facilitate camera-related processes and functions; and/or other software instructions 472 to facilitate other processes and functions, e.g., peer-to-peer communication functions as described in reference to FIG. 2. In some implementations, the media processing instructions 466 are divided into audio processing instructions and video processing instructions to facilitate audio processing-related processes and functions and video processing-related processes and functions, respectively. An event requests managing instruction 474 or similar hardware managing module can also be stored in memory 450.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the communication device can be implemented in hardware and/or in software, including in one or more signal processing and/or application specific integrated circuits.

Figure 5:
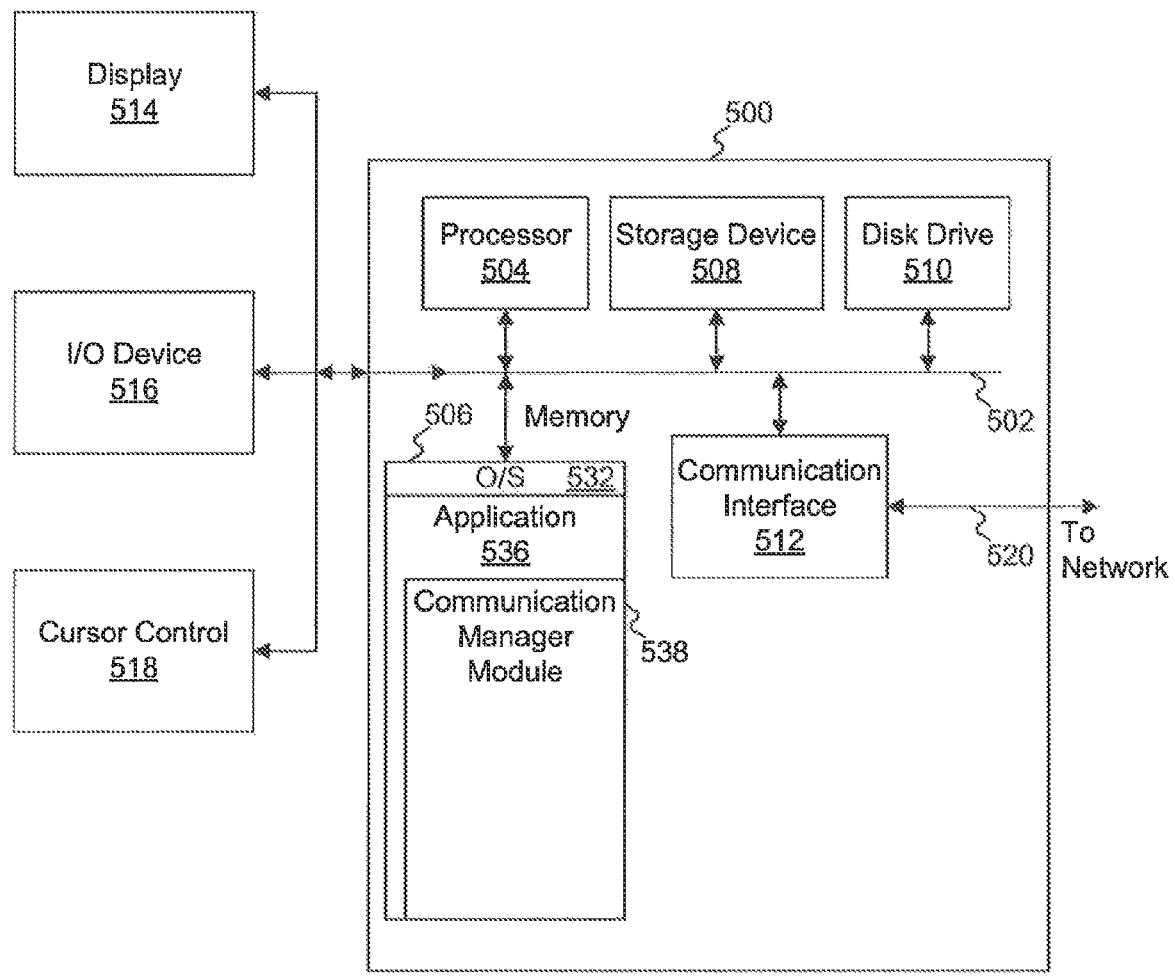
FIG. 5 is a diagram of another example system environment for implementing embodiments consistent with the present disclosure.

FIG. 5 illustrates an example computer system 500 suitable for managing event scheduling requests, according to at least one embodiment. In some examples, computer system 500 can be used to implement computer programs, applications, methods, processes, or other software to perform the described techniques and to realize the structures described herein, such as communication servers 119*a-d* and/or router 213A. Computer system 500 includes a bus 502 or other communication mechanism for communicating information, which interconnects subsystems and devices, such as one or more processors 504, system memory ("memory") 506, storage device 508 (e.g., ROM), disk drive 510 (e.g., magnetic or optical), communication interface 512 (e.g., a modem, Ethernet card, or any other interface configured to exchange data with a communications network), display 514 (e.g., CRT or LCD), input device 516 (e.g., keyboard), and pointer cursor control 518 (e.g., mouse or trackball).

According to some examples, computer system 500 performs specific operations in which processor 504 executes one or more sequences of one or more instructions stored in system memory 506. Such instructions can be read into system memory 506 from another computer readable medium, such as static storage device 508 or disk drive 510. In some examples, hard-wired circuitry can be used in place of or in combination with software instructions for implementation. In the example shown, system memory 506 includes modules of executable instructions for implementing an operation system ("O/S") 532, an application 536, and a communication manager module 538, which can provide the functionalities disclosed herein.

In some examples, execution of the sequences of instructions can be performed by a single computer system 500. According to some examples, two or more computer systems 500 coupled by communication link 520 (e.g., links to LAN, PSTN, or wireless network) can perform the sequence of instructions in coordination with one another. Computer system 500 can transmit and receive messages, data, and instructions, including program code (i.e., application code) through communication link 520 and communication interface 512. Received program code can be executed by processor 504 as it is received, and stored in disk drive 510, or other non-volatile storage for later execution.

Figure 6:
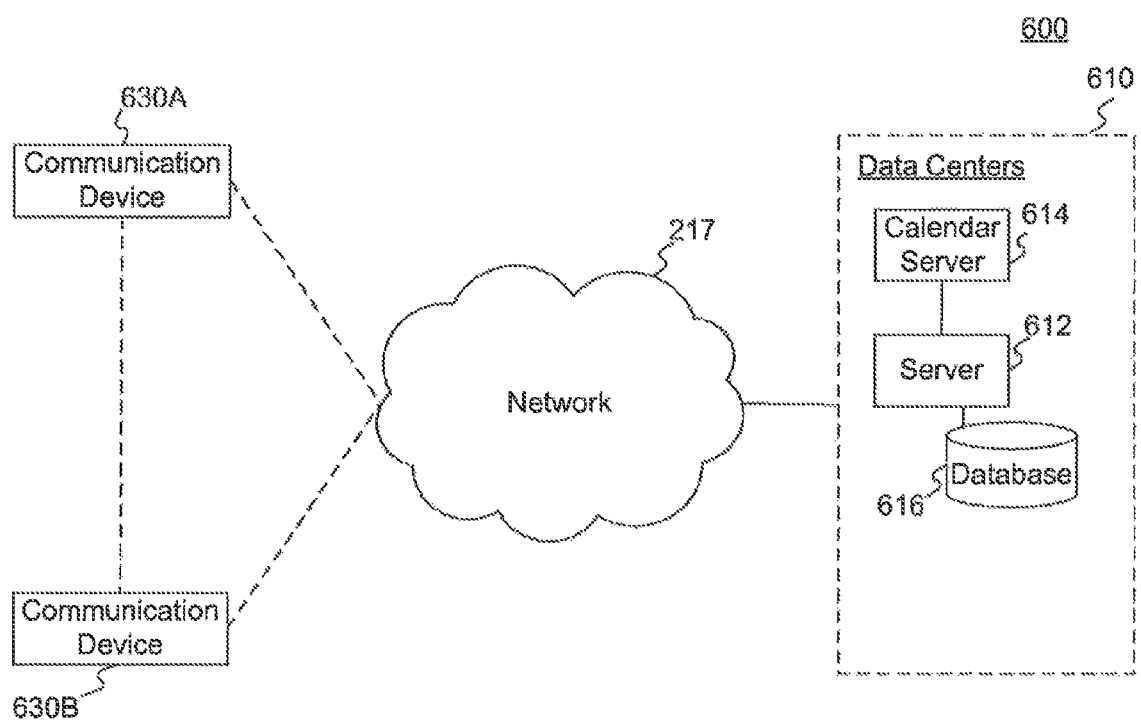
FIG. 6 is a simplified block diagram of an example of a telephony system for managing an event scheduling request.

FIG. 6 is a diagram of an example system environment 600 for implementing embodiments consistent with the present disclosure. System environment 600 can include one or more data centers 610, one or more communication devices 630, and network 217. Data centers 610 can correspond to data centers 101, 102, and 103 as described above. A data center 610 can include, for example, servers 612, 614, and database 616. In certain embodiments, server 612 can be implemented as a communication server, and server 614 can be implemented as a calendar server. Communication devices 630A and 630B can correspond to communication device 243 depicted in FIG. 2 and be implemented using architecture 400 depicted in FIG. 4.

Referring to FIG. 6, communication device 630A can communicate directly with communication device 630B using, e.g., short range or near field technologies such as Bluetooth® technologies. Communication device 630A can also communicate with communication device 630B using network 217. For example, communication devices 630A and 630B can communicate with each other using a cellular network or a Wi-Fi network. Communication devices 630A and 630B can also communicate with data centers 610 using network 217. Communication devices 630A and 630B can provide one or more principal modes of communication including, for example, a data communication mode, a voice communication mode, and a video communication mode.

In some embodiments, a call can be established between communication device 630A and communication device 630B. The call can be a voice call, a voice-over-IP call, a video call, a call using interactive voice response (IVR) technologies, or any other type of call that communicates voice, video, or data. In certain embodiments, the call established between communication devices 630A and 630B enables communication between the human users. In certain other embodiments, the call established between communication devices 630A and 630B enables communication between a human user and an automated system such as an IVR system. An IVR system is a system that allows a computer or a communication device to interact with humans based on the use of voice and/or keypad inputs of dual-tone multi-frequency (DTMF) tones. As an example, one or both communication devices 630A and 630B can include an IVR system to interact with a human user of the other communication device.

After communication device 630A receives the call, it can authenticate a user identity associated with the communication device 630B. The user identity identifies the user of communication device 630B. As an example, the user of communication device 630B can be an auto mechanic. Using communication device 630B, the auto mechanic calls a car owner, who is the user of communication device 630A. Before communication device 630A can allow exchange of data with communication device 630B, communication device 630A authenticates communication device 630B. To authenticate, communication device 630A uses one or more of: a phone number associated with communication device 630B, a caller identification (caller ID), an Internet protocol (IP) address, a certificate, a key, a password, token, a voice print identification, etc. As an example of authentication, communication device 630A can determine whether the phone number associated with communication device 630B matches with an existing phone number stored in communication device 630A or stored in server 612. If the phone number matches, communication device 630A authenticates the user identity associated with the communication device 630B.

After authenticating the user identity, communication device 630A enables the exchange of data with communication device 630B. For example, after authenticating the user identity, communication device 630A acquires an event scheduling request during the call. The event scheduling request can be provided by communication device 630B. An event scheduling request is a request for scheduling a future event, such as an appointment, a conference, a future payment, a party, an update of user account, or any other event that may occur in the future. The event scheduling request can be, for example, a calendar invitation, a text message (e.g., an SMS message), an email, a notification (e.g., a push notification on a smartphone), DTMF tones, etc.

In certain embodiments, for acquiring the event scheduling request during a call, communication device 630A can obtain event scheduling information based on one or more attributes of the call, such as the content of the call and the contextual information associated with the call. The contextual information can be, for example, a determination of an upcoming or overdue event (e.g., an overdue oil change maintenance), a dedicated phone line (e.g., phone line for making driving test appointments), or data stored in a database (database 616 or an auto mechanic database stored on communication device 630B or servers 612/614). The event scheduling information includes scheduling details of a future event, including e.g., the date, time, location, and attendees of the future event. In one implementation, communication device 630A can monitor and record the voice communication between the users of communication devices 630A and 630B. While the call is in progress, communication device 630A can use voice recognition techniques to convert spoken words in the voice communication to text and identify the subject matter of the voice communication and/or identify certain keywords related to scheduling a future event. Based on this voice recognition, communication device 630A can determine, during the call, whether the users intend to schedule an event and obtain event scheduling information. In the above example of an auto mechanic calling a car owner to schedule an oil change appointment, communication device 630A can monitor and record the conversation between the auto mechanic and the car owner. While the users are still in the call, communication device 630A converts some or all of the spoken conversation to text, and identifies in the text that the subject matter of the conversation is about scheduling an oil change appointment. Communication device 630A can also identify certain keywords such as "oil change," "Tuesday," "3 PM," etc. Using the identified keywords, communication device 630A can obtain the event scheduling information (e.g., an oil change appointment at Tuesday 3 PM at the auto mechanic) associated with the future event.

In some embodiments, communication device 630A can obtain event scheduling information using its IVR system. An IVR system of communication device 630A can interact with the user of communication device 630B by voice or DTMF tones to obtain the event scheduling information. For example, when an auto mechanic calls a car owner to schedule an oil change appointment, the IVR system of the car owner's communication device 630A can interact with the auto mechanic using a voice menu to determine certain event scheduling information, such as the date, time, location, etc. of the oil change appointment.

In certain embodiments, communication device 630A can obtain event scheduling information based on contextual information provided to communication device 630A. As stated above, the contextual information can be, for example, a dedicated phone line or a determination of an upcoming or overdue event (e.g., an overdue oil change maintenance appointment) or data stored in a database (database 616 or an auto mechanic database stored on communication device 630B or servers 612/614), Communication device 630A can use the contextual information directly or indirectly (e.g., extracting certain information from the contextual information) to generate the event scheduling information. The contextual information can be stored on one or more of communication devices 630A, 630B, servers 612, 614, and any other suitable communication devices. As an example, the contextual information can be a phone number stored on server 614 or database 616, where the phone number is associated with a dedicated phone line. As another example, the contextual information can be an overdue oil change maintenance appointment that is stored in a calendar application associated with communication device 630A, 630B, and/or server 612.

Using the event scheduling information from the call, communication device 630A can obtain the related calendar information. In some embodiments, the calendar information indicates whether the user is available at the time included in the event scheduling information and provides no further information of the user, such as why the user is available or not available. In other embodiments, the calendar information provides information on user's availability at the time included in the event scheduling information, reasons for the user's availability or unavailability, and/or any other desired information. In the above example, while the users are still in the call, communication device 630A can access the user's calendar to determine the user's availability corresponding to the event scheduling information (e.g., an oil change appointment at Tuesday 3 PM at the auto mechanic). The user's calendar can be, for example, a Microsoft Outlook® calendar, a mobile phone calendar, or an online E-mail calendar.

In certain embodiments, communication device 630A can provide the calendar information, which indicates whether the user is available at the particular time, to communication device 630B while the users of communication devices 630A and 630B are still in the call. If the calendar information indicates that the user of communication device 630A is available at the particular time, communication device 630B generates a calendar invitation corresponding to that time and sends the calendar invitation to communication device 630A. If the calendar information indicates that the user of communication device 630A is unavailable at the time, communication device 630B can generate a calendar invitation proposing one or more alternative times and sends the calendar invitation to communication device 630A.

In some embodiments, communication device 630A can include a calendar coordination module (not shown) to allow communication device 630B to send a calendar invitation to communication device 630A. For example, a calendar coordination module can enable communication device 630B to push a calendar invitation to communication device 630A.

The calendar coordination module can be a hardware and/or a software component for coordinating the calendar invitation provided by communication device 630B with the calendaring system of communication device 630A. In certain embodiments, the calendar coordination module can also enable the calendaring system of communication device 630A to display the calendar invitation pushed by communication device 630B, to obtain the user input with respect to the calendar invitation (e.g., accept, denial, or dismiss), and to send a notification to communication device 630B.

As described above, in certain embodiments, communication device 630A can facilitate management of an event scheduling request, including establishing a call with communication device 630B, authenticating the user identity associated with communication device 630B, determining an event scheduling request, and providing a notification to communication device 630B based on the event scheduling request. In other embodiments, server 612 can facilitate management of an event scheduling request, and perform the same or similar functions.

Referring to FIG. 6, server 612 can establish and monitor the communication between the users of communication devices 630A and 630B. Server 612 can be implemented as, for example, communication server 119. Server 612 can establish a call between communication devices 630A and 630B. For example, upon receiving a request from communication device 630B to connect with communication device 630A, server 612 establishes a voice call between communication devices 630A and 630B. Server 612 can also authenticate the user identity associated with communication device 630B in a manner similar to authenticating by communication device 630A. In certain embodiments, server 612 can authenticate the user identity associated with both communication device 630A and communication device 630B. Upon authenticating the user identity associated with one or both communication devices 630A and 630B, server 612 enables data exchange between communication devices 630A and 630B.

Server 612 can also acquire event scheduling information based on one or more attributes of the call including at least one of content from the call or contextual information. As an example, server 612 can use voice recognition techniques to convert some or all of spoken words to text and identify in the text the subject matter of the communication and/or identify certain keywords related to scheduling a future event. Based on this voice recognition, server 612 can determine, during the call, whether the users intend to schedule an event and obtain event scheduling information. In the above example of an auto mechanic calling a car owner to schedule an oil change appointment, server 612 can monitor and record the conversation between the auto mechanic and the car owner. While the users are still engaged in the call, for example, server 612 converts some or all of the spoken conversation to text, and identifies in the text that the subject matter of the conversation is about scheduling an oil change appointment. Server 612 can also identify certain keywords such as "oil change," "Tuesday," "3 PM," etc. Using the identified keywords, server 612 can obtain the event scheduling information (e,g., an oil change appointment at Tuesday 3 PM at the auto mechanic) associated with the future event.

In certain embodiments, server 612 can obtain event scheduling information using an IVR system. The operation of the IVR system to obtain the event scheduling information is similar to those described above with respect to communication device 630A and thus not repeated.

Using the event scheduling information, server 612 can obtain calendar information to determine the availability of the user of communication device 630A. Server 612 can obtain the calendar information from at least one of: communication device 630A, server 612 itself, calendar server 614, or database 616. Calendar server 614 and/or database 616 store calendar information of one or more communication devices 630 including devices 630A and 630B. In certain embodiments, at least one of server 612, calendar server 614, or database 616 can synchronize the stored calendar information with the calendar information on each individual communication device, e.g., communication device 630A.

After obtaining the calendar information, server 612 can provide it to communication device 630B while the users of communication devices 630A and 630B are still in the call. If the calendar information indicates that the user of communication device 630A is available at the particular time identified by communication device 630A, communication device 630B generates a calendar invitation of that time and sends the calendar invitation to communication device 630A. If the calendar information indicates that the user of communication device 630A is unavailable at the time, communication device 630B can generate a calendar invitation proposing one or more alternative times and sends the calendar invitation to communication device 630A.

In another implementation, for determining an event scheduling request during a call, communication device 630A, or server 612, receives the event scheduling request from communication device 630B during the call without first providing the calendar information indicating the user's availability to communication device 630B. For example, during the call from an auto mechanic to a car owner, without knowing the availability of the car owner, the auto mechanic can use communication device 630B to send a proposed calendar invitation to communication device 630A or server 612. In certain embodiments, communication device 630B generates the event scheduling request, which includes the proposed calendar invitation, based on its user inputs and/or based on the content of the call or contextual information. As an example of generating the event scheduling request based on its user inputs, communication device 630B can provide a user interface (e.g., using touch screen 446 shown in FIG, 4) that displays a calendar while the users of communication devices 630A and 630B are still in the call. The user of communication device 630B selects the available time in the calendar and communication device 630B stores the selected time in a calendar invitation, generates the calendar invitation, and sends the calendar invitation to communication device 630A or server 612. One of ordinary skill in the art should understand that communication device 630B can also provide any other application for its user to generate an event scheduling request based on the content of the call or contextual information.

As an example of generating the event scheduling request based on the content from the call, similar to communication device 630A, communication device 630B monitors and records the voice communication between the users of communication devices 630A and 630B. While the users are still in the call, communication device 630B can use voice recognition techniques to convert some or all spoken words in the voice communication to text and identify in the text the subject matter of the voice communication and/or identify certain keywords related to scheduling future event. Based on the identification, communication device 630B can determine, during the call, whether the users intend to schedule an event and obtain event scheduling information that includes scheduling details of the event. Using the event scheduling information, communication device 630B generates the calendar invitation and sends the calendar invitation to communication device 630A or server 612.

Referring to FIG. 6, in certain embodiments, after communication device 630A acquires the event scheduling request, such as a calendar invitation, from communication device 630B, it can provide a user interface (e.g., using touch screen 446 shown in FIG. 4) that displays the event scheduling request while the user of communication devices 630A and 630B are still in the call. For example, communication device 630A can display a calendar invitation, a text message, a push notification, etc. Communication device 630A then obtains user inputs with respect to the displayed event scheduling request. The user input can he to accept, deny, or dismiss the calendar invitation or a push notification. The user input can also be copy and paste the content of a text message to the user's calendar, or compose a reply email message for confirming or denial of the event scheduling request.

In certain embodiments, based on the user inputs, communication device 630A generates a notification. In other embodiments, communication device 630A generates a notification without receiving any user inputs. For example, when communication device 630B provides the event scheduling request using the calendar information that indicates a particular time is available to the user of communication device 630A, communication device 630A does not require its user to provide further input and can generate a notification confirming the event.

After generating the notification, communication device 630A sends it to communication device 630B while the users of communication devices 630A and 630B are still in the call. The notification can include a confirmation of scheduling the event in response to the event scheduling request. The notification can also indicate that the user of communication device 630A is unavailable. The notification can further include an alternative, proposal for scheduling the event.

In other embodiments, if server 612 acquires the event scheduling request, such as a calendar invitation, from communication device 630B server 612 can provide the event scheduling request to communication device 630A for receiving user inputs and generate the notification based on the user inputs. Server 612 can also generate the notification without providing the event scheduling request to communication device 630A for user inputs. After generating the notification, server 612 provides it to communication device 630B. Similar to the above description, the notification can include a confirmation of scheduling the event or an indication that the user of communication device 630A is unavailable. The notification can further include an alternative proposal for scheduling the event.

In the various disclosed embodiments, communication devices 630A, or server 612, can determine an event scheduling request from and in response, send a notification to communication device 630B, while the users of communication devices 630A and 630B are still in the call. An event can thus be effectively scheduled based on the content of the call, reducing the effort required from the users. In the above example, during the call between the auto mechanic and the car owner for scheduling an oil change appointment, the communication device of the car owner (i.e., communication device 630A) or server 612 can provide the auto mechanic's communication device (i.e., communication device 630B) the availability of the car owner at one or more particular times. Communication device 630B can generate a calendar invitation using the car owner's availability information and send an appointment scheduling request to communication device 630A, or server 612. Communication device 630A or server 612 then sends a notification to communication device 630B to confirm the appointment. Thus, while the call between the auto mechanic and the car owner are still in progress, the oil change appointment can be effectively scheduled. The car owner or the auto mechanic need not make additional efforts after the call to schedule the appointment.

In the above embodiments, communication device 630A and/or server 612 authenticates the user identity associated with the communication device 630B, determines an event scheduling request based on one or more attributes of the call, and provides a notification to communication device 630B. The user of communication device 630B can be, for example, a service provider such as an auto mechanic. In certain other embodiments, the user of communication device 630A, such as a car owner, calls a service provider to schedule a future event. Similar to the above description with respect to communication device 630A, communication device 630B can authenticate the user identity associated with communication device 630A, determine an event scheduling request based on one or more attributes of the call, and provide a notification to communication device 630A.

As an example, communication device 630B can obtain event scheduling information using its IVR system. An IVR system of communication device 630B can interact with the user of communication device 630A by voice or DTMF tones to obtain the event scheduling information. For example, when a car owner calls an auto mechanic to schedule an oil change appointment, the IVR system of the auto mechanic's communication device 630B can interact with the car owner using a voice menu to determine certain event scheduling information, such as the date, time, location, etc. of the oil change appointment. Based on the information obtained using the IVR system, communication device 630B can determine an event scheduling request.

In some embodiments, a communication channel can be used for a voice, video, or VoIP call between the users of communication devices 630A and 630B and for managing the event scheduling request. A communication channel is defined broadly as referring to a physical transmission medium such as a wire or to a logical connection over a multiplexed medium such as a radio channel. A communication channel is used to convey an information signal, e.g., a digital hit stream, from one or several senders (or transmitters) to one or several receivers. As shown in FIGS. 4 and 6, communication devices 630A and 630B can transmit and receive information signals via their respective wireless communication subsystems 424. Communication subsystem 424 can be designed to operate over a GSM network, a GPRS network, an EDGE network, a Wi-Fi or WiMax network, and a Bluetooth® network. Therefore, communication subsystem 424 can facilitate PSTN (public switched telephone network) voice calls, VoIP calls, and transmitting data via a logical connection between communication devices 630A and 630B. As an example, the logical connection between communication devices 630A and 630B can be used for transmitting PSTN voice calls, packet-based VoIP calls, and event scheduling request data. As a result, communication devices 630A and 630B can effectively facilitate event scheduling using the same communication channel while the users are still in the call.

In certain embodiments, after an event is scheduled as described in various embodiments above, one or more of server 612 and communication device 630A and 630B can enable persistent access to the scheduled event such that one or both communication device 630A and 630B can exchange updates or notes with each other. For example, using communication device 630A, the car owner can add a note, such as "heavy traffic . . . running a bit late". Communication device 630A, or server 612, can provide the note to communication device 630B. As another example, using communication device 630B, the auto mechanic can add a note, such as "ask for Pete upon your arrival . . . he will make sure you get processed quickly and get the earliest shuttle." Communication device 630B, or server 612, can provide the note to communication device 630A. In certain embodiments, the ability to exchange of updates or notes between communication devices 630A and 630B is based on the authorization. For example, the authorization for exchanging updates or notes can be limited to accessing and updating the calendar invite as it appears in the calendars of both communication devices 630A and 630B.

Figure 7:
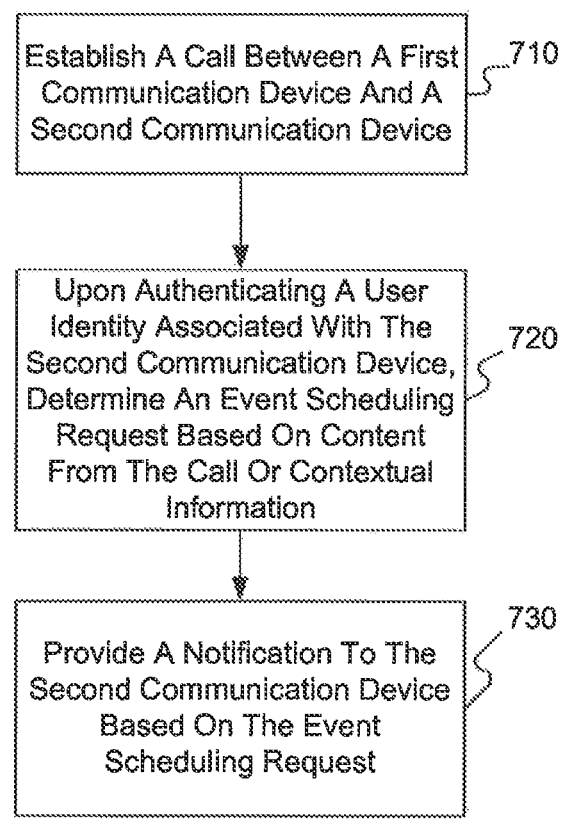
FIG. 7 is a flowchart illustrating operation of a particular implementation of a communication system for managing an event scheduling request.

FIG. 7 depicts an example process 700 for managing an event scheduling request, in accordance with some embodiments of the present disclosure. The steps associated with this example process can be performed by the components of FIG. 1, 2, 3, 4, 5, or 6. In the following description, reference is made to certain components of FIG. 6 for purposes of illustration. It will be appreciated, however, that other implementations are possible and that components other than that illustrated in FIG. 6 can be utilized to implement the example process of FIG. 7.

In step 710, a first communication device (e.g., communication device 630A) or a server (e.g., server 612) can establish a call between the first communication device and a second communication device (e.g., communication device 630B). As an example, communication device 630A, whose user can be a car owner, receives a call from an auto mechanic that uses communication device 630B. As another example, upon receiving a request from the second communication device, server 612 can connect the first and the second communication devices. After establishing the call, the first communication device or the server authenticates the user identity associated with the second communication device. The authentication can be based on one or more of a phone number associated with the second communication device, a caller identification (caller ID), an Internet protocol (IP) address, a certificate, a key, a password, token, etc. For example, if the first communication device or the server determines that the phone number of the second communication device matches with an existing phone number, the user identity associated with the second communication device is authenticated.

Figure 8:
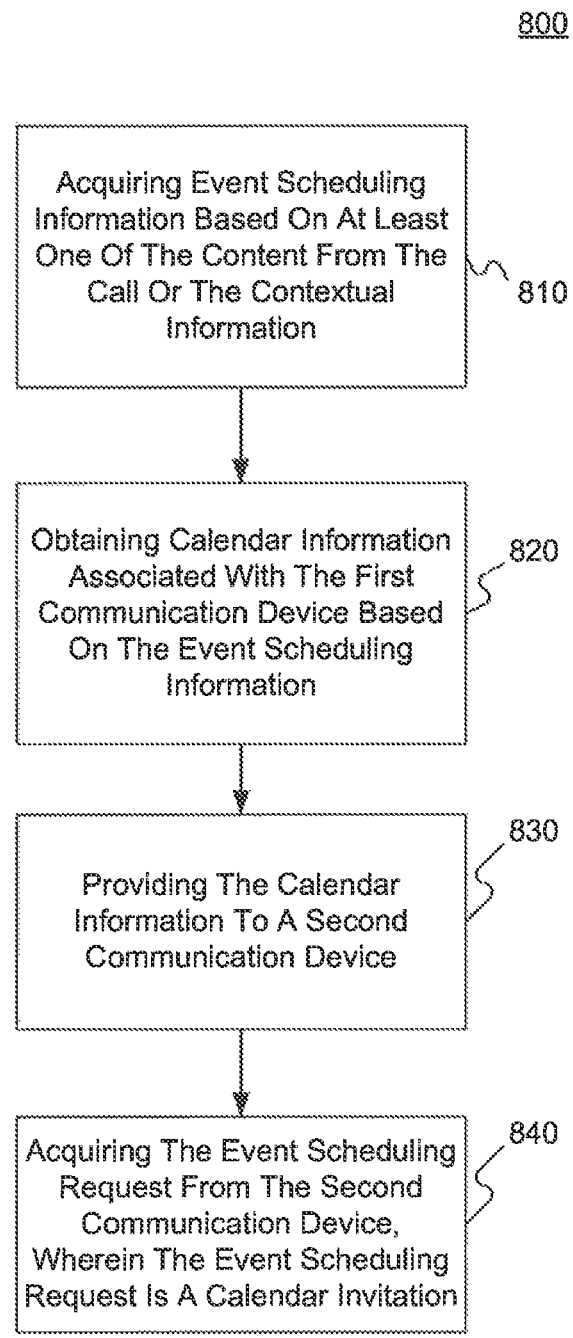
FIG. 8 is a flowchart illustrating operation of a particular implementation of a communication system for determining an event scheduling request based on one or more attributes of the call.

In step 720, upon authenticating the user identity associated with the second communication device, the first communication device or the server determines, during the call, an event scheduling request based on one or more attributes of the call including at least one of the content from the call or contextual information provided to the first communication device. FIG. 8 depicts an example, process 800 for determining an event scheduling request as illustrated in step 720.

Referring to FIG. 8, in certain embodiments, the first communication device or the server acquires (step 810) event scheduling information based on at least one of the content from the call or contextual information associated with the call. The event scheduling information includes event scheduling details of a future event. Using the event scheduling information, the first communication device or the server obtains (step 820) calendar information associated with the first communication device based on the content of the call and/or the contextual information. As an example, the first communication device or the server monitors and records the communication between the users of the first and second communication devices and identifies that the communication relates to scheduling a future event. The first communication device or the server can also identify specific event scheduling information using, for example, keywords in the communication. Based on the event scheduling information, the first communication device or the server obtains the calendar information, which indicates the availability of the user of the first communication device.

After obtaining the calendar information, the first communication device or the server provides (step 830) it to the second communication device and acquires (step 840) the event scheduling request from the second communication device, if the calendar information indicates that the user of the first communication device is available at the particular time, the second communication device generates an event scheduling request, such as a calendar invitation, corresponding to that time and sends the event scheduling request to the first communication device, if the calendar information indicates that the user of the first communication device is unavailable at the time, the second communication device generates an event scheduling request proposing one or more alternative times and sends the an event scheduling request to first communication device. In certain embodiments, the second communication device can provide an event scheduling request to the first communication device or the server without receiving the calendar information that indicates the user's availability from the first communication device.

Referring back to FIG. 7, in step 730, the first communication device or the server provides, during the call, a notification to the second communication device based on the event scheduling request. The notification can be a confirmation of scheduling the event in response to the event scheduling request. The notification can also indicate that the user of the first communication device is unavailable at the proposed time and include a proposal of one or more alternative times for scheduling the event.

As will be appreciated from the foregoing, the process for managing event scheduling request can be accomplished automatically with little or no user intervention. This can effectively use contextual information, such as the content from the call, to significantly reduce the user efforts required for scheduling a future event.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular protocols herein are merely by way of examples. Suitable alternatives or those later developed known to those of skill in the art may be employed without departing from the scope of the invention.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for managing an event scheduling request, comprising:
   establishing a call with voice communication between a first communication device and a second communication device;
   while the call with voice communication is in progress, obtaining event scheduling information for scheduling a future event based on one or more attributes of the call;
   obtaining, from the first communication device, calendar information associated with a user of the first communication device, based on the event scheduling information;
   providing the calendar information to the second communication device;
   acquiring an event scheduling request for scheduling a future event from the second communication device, the event scheduling request including a calendar invitation generated based on the calendar information; and
   providing a notification regarding the future event to the second communication device.

2. The method of claim 1, further comprising authenticating a user identity associated with the second communication device based on at least one of: a phone number, a caller identification (caller ID), an internet protocol (IP) address, a certificate, or a voice print identification.

3. The method of claim 1, wherein the one or more attributes of the call include at least one of content from the call or contextual information associated with the call.

4. The method of claim 3,
   wherein obtaining the event scheduling information comprises obtaining the event scheduling information based on at least one of the content from the call or the contextual information, the event scheduling information including event scheduling details of the future event, and
   wherein the calendar information associated with the user of the first communication device indicates availability of the user of the first communication device.

5. The method of claim 4, wherein the obtaining of the event scheduling information is based on at least one of voice recognition of the content from the call, interactive voice responses (IVRs), or dual-tone multi-frequency (DTMF) tones.

6. The method of claim 4, wherein the calendar information associated with the user of the first communication device indicates the availability of the user of the first communication device without indicating a reason associated with the availability.

7. The method of claim 1,
   wherein providing the notification comprises:
   sending a confirmation of scheduling the future event; or sending a proposal of an alternative time for scheduling the future event.

8. The method of claim 1, wherein the method is being performed in one communication channel that provides voice and data communication capability.

9. A server, comprising:
   at least one processor configured to:
   establish a call with voice communication between a first communication device and a second communication device;
   while the call with voice communication is in progress, obtain event scheduling information for scheduling a future event based on one or more attributes of the call;
   obtain, from the first communication device, calendar information associated with a user of the first communication device, based on the event scheduling information;
   provide the calendar information to the second communication device;
   acquire an event scheduling request for scheduling a future event from the second communication device, the event scheduling request including a calendar invitation generated based on the calendar information; and
   providing a notification regarding the future event to the second communication device.

10. The server of claim 9, further comprising authenticating a user identity associated with the second communication device based on at least one of: a phone number, a caller identification (caller ID), an internet protocol (IP) address, a certificate, or a voice print identification.

11. The server of claim 9, wherein the one or more attributes of the call include at least one of content from the call or contextual information associated with the call.

12. The server of claim 11, wherein the at least one processor is configured to:
   obtain the event scheduling information based on at least one of the content from the call or the contextual information, the event scheduling information including event scheduling details of the future event;
   wherein the calendar information associated with the user of the first communication device indicates availability of the user of the first communication device.

13. The server of claim 12, wherein the obtaining of the calendar information associated with the user of the first communication device is based on at least one of voice recognition of the content from the call, interactive voice responses (IVRs), or dual-tone multi-frequency (DTMF) tones.

14. The server of claim 12, wherein the calendar information associated with the user of the first communication device indicates the availability of the user of the first communication device without indicating a reason associated with the availability.

15. The server of claim 9, wherein the at least one processor is configured to provide a notification to the second communication device by:
   sending a confirmation of scheduling the future event; or
   sending a proposal of an alternative time for scheduling the future event.

16. The server of claim 9, wherein the at least one processor is configured to communicate in one communication channel that provides voice, and data communication capability.

17. A non-transitory computer-readable storage medium that comprises a set of instructions that are executable by at least one processor to cause the at least one processor to perform a method for managing an event scheduling request, the method comprising:
   establishing a call with voice communication between a first communication device and a second communication device;
   while the call with voice communication is in progress, obtaining event scheduling information for scheduling a future event based on one or more attributes of the call;

obtaining, from the first communication device, calendar information associated with a user of the first communication device, based on the event scheduling information;

providing the calendar information to the second communication device;

acquiring an event scheduling request for scheduling a future event from the second communication device, the event scheduling request including a calendar invitation generated based on the calendar information; and providing a notification regarding the future event to the second communication device.

18. The computer-readable storage medium of claim 17, wherein the one or more attributes of the call include at least one of content from the call or contextual information associated with the call.

19. The computer-readable storage medium of claim 18, wherein the event scheduling information includes event scheduling details of a future event, and wherein the calendar information indicates availability of the user of the first communication device.

20. The computer-readable storage medium of claim 19, wherein the obtaining of the event scheduling information is based on at least one of voice recognition of the content from the call, interactive voice responses (IVRs), or dual-tone multi-frequency (DTMF) tones.

* * * * *